United States Patent [19]

McWethy

[11] 4,055,359
[45] Oct. 25, 1977

[54] QUICK-CONNECT TUBULAR COUPLINGS

[75] Inventor: Irvin E. McWethy, Gravette, Ark.

[73] Assignee: Ford Motor Company, Dearborn, Mich.

[21] Appl. No.: 632,874

[22] Filed: Nov. 17, 1975

[51] Int. Cl.² .................................... F16L 35/00
[52] U.S. Cl. .................................. 285/39; 285/318; 285/347; 285/351; 285/DIG. 25
[58] Field of Search ............... 285/318, 317, 316, 315, 285/308, 39, 321, DIG. 25, 13, 14, DIG. 7, 382.5, 347, 35

[56] References Cited

U.S. PATENT DOCUMENTS

| 2,914,344 | 11/1959 | Anthes | 285/321 X |
| 2,939,728 | 6/1960 | Bitel | 285/315 |
| 3,304,104 | 2/1967 | Wiltse | 285/321 X |
| 3,453,005 | 7/1969 | Foults | 285/DIG. 25 |
| 3,532,101 | 10/1970 | Snyder | 285/318 X |
| 3,569,903 | 3/1971 | Brishka | 285/315 X |
| 3,924,883 | 12/1975 | Frank | 285/382.5 |
| 3,929,357 | 12/1975 | Devincent et al. | 285/DIG. 25 |

FOREIGN PATENT DOCUMENTS 1,277,984 10/1961 France .................. 285/318

Primary Examiner—Dave W. Arola
Attorney, Agent, or Firm—John J. Roethel; Keith L. Zerschling

[57] ABSTRACT

A quick-connect tubular coupling for a pair of tubes one of which has an end portion telescopically disposed within an end portion of the other. An annular cage is externally mounted on the one or inner tube in axially spaced relation to the free end of its end portion. The cage is held on the one tube against axial displacement along the latter. The end portion of the other or outer tube is flared outwardly at its free end and extends in the cage. A circular spring means is interposed between the flared end portion of the other tube and the cage and when so disposed prevents axial movement of the one tube relative to the other in telescopic disengagement direction. Between the telescoped end portions are a plurality of "O" rings that are compressed in a sealed mode to prevent leakage through the coupling.

7 Claims, 7 Drawing Figures

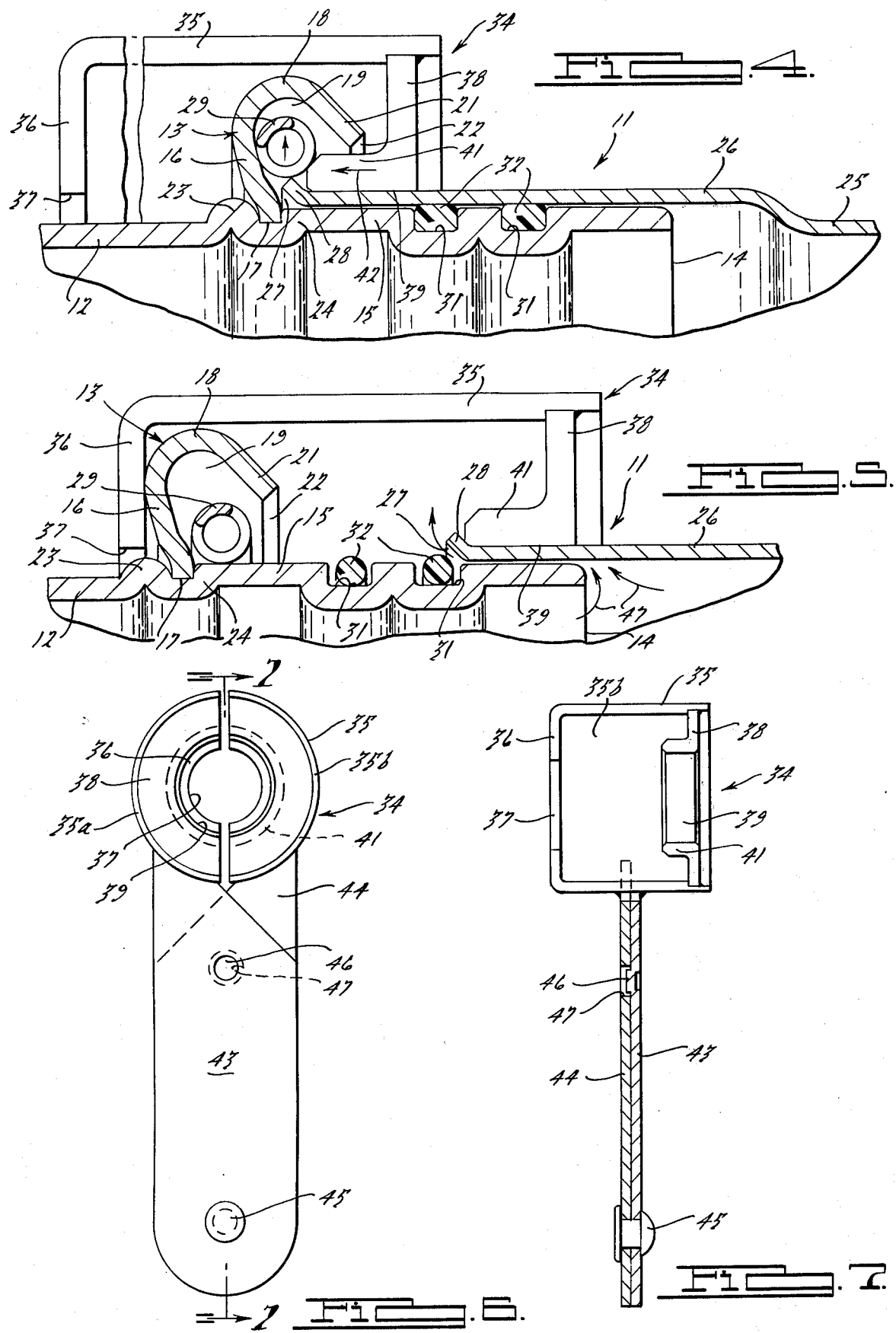

QUICK-CONNECT TUBULAR COUPLINGS

BACKGROUND OF THE INVENTION

In many automotive, household appliance and machine tool applications, fluid conduits or tubes that carry pressurized fluids must be capable of being disconnected to permit repair or replacement of components of the system. To facilitate initial connection and subsequent disconnection, there has been developed a class of quick-connect fittings or tube coupling devices as exemplified by the disclosure of U.S. Pat No. 3,711,125 issued Jan. 16, 1973 to David C. Dehar for a "Quick-Connect Fitting for a Hydraulic Conduit" and the disclosure of U.S. application Ser. No. 528,108 filed Nov. 11, 1974 by Phillip A. Sandford and John D. York for a "Quick-Connect Tubing Coupling", now U.S. patent issued.

As a result of the earlier development work on quick-connect/disconnect fittings as exemplified by the above patents, design criteria have been established for such devices. These include but are not limited to the following:

1. Connect/disconnect assembly time must be significantly reduced over currently available fittings,
2. Connection must be accomplished by hand push effort, although use of a tool for disconnection is permissible,
3. The cost of the components must be as low as possible and is to be achieved in part by the elimination of screw parts,
4. The quick-connect assemblies must weigh less than current fittings available,
5. The "O" ring must be visible and secured in a groove to avoid warranty rework because of missing "O" rings,
6. Less dependence on human factor during assembly, thereby anticipating reliability improvements and warranty cost reduction,
7. Coupling must have no rotary orientation requirement, thereby allowing hose assembly to neutralize all torsional stresses in the system, and
8. The design must have no threads thereby eliminating cross threading.

It is an object of the present invention to provide a quick-connect fitting that will satisfy the foregoing criteria.

SUMMARY OF THE INVENTION

The present invention relates to a quick-connect tubular coupling comprising a pair of tubes one of which has an end portion telescopically disposed within an end portion of the other. An annular cage is externally mounted on the one or inner tube in axially spaced relation to the free end of its end portion. The cage is held on the one tube against axial displacement along the latter. The end portion of the other or outer tube is flared outwardly at its free end and extends in the cage. A circular spring means is interposed between the flared end portion of the other tube and the cage and when so disposed prevents axial movement of the one tube relative to the other in telescopic disengagement direction. Between the telescoped end portions are a plurality of "O" rings that are compressed in a sealed mode to prevent leakage through the coupling.

Preferably, the circular spring means comprises an expandable garter spring which may be expanded into the cage by a tool. When expaneded, the garter spring may slip over the flare to permit withdrawal of the free end of the outer tube from the cage means and subsequently telescopic disengagement of the tubes.

The tool preferably is characterized in that it has stop means engageable with the cage means limiting withdrawal movement of the second or outer tube relative to the first or inner tube to a position at which the "O" ring means is released from its sealed mode to provide a pressure relief vent. After the system is vented, the tool may be disengaged to permit complete separation of the tube portions.

DESCRIPTION OF THE DRAWINGS

Further features and advantages of the present invention will be made more apparent as this description proceeds, reference being had to the accompanying drawing, wherein:

FIG. 4 is a view illustrating a coupling disconnect tool in position to cause coupling disconnection;

FIG. 5 is a view in part similar to FIG. 4, illustrating the coupling partially disconnected to provide for pressure relief venting of the system.

FIG. 6 is a front elevation of the disconnect tool; and

FIG. 7 is a section view on the line 7—7 of FIG. 6.

DETAILED DESCRIPTION OF THE INVENTION

Figure 1:
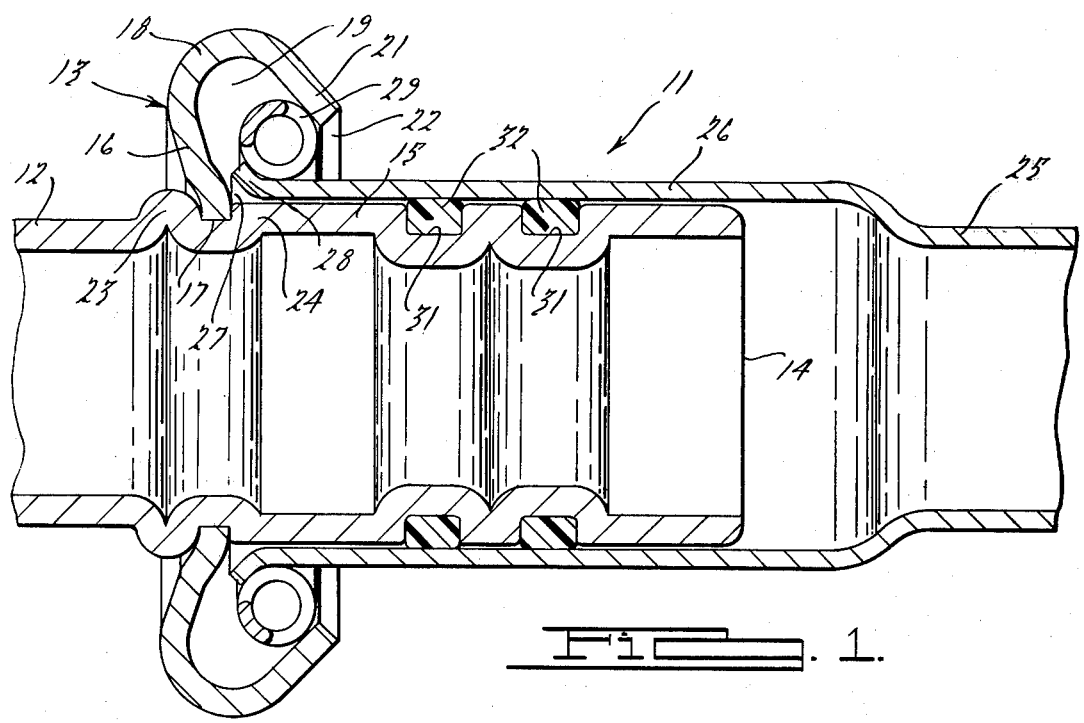
FIG. 1 is a sectional assembly view of quick-connect tubular coupling embodying the present invention.

Referring now to the drawings, in FIG. 1 the reference numeral 11 generally designates the quick-connect tubular coupling embodying the present invention. The coupling 11 comprises a first tube 12 having a cup-shaped cage 13 externally mounted thereon, the cage 13 being positioned on the tube 13 in axially spaced relation to the free end 14 of the latter. This provides a substantially elongated end portion 15 of the tube between the cage 13 and the tube end 14.

The cage has a substantially radially extending base portion 16 having a circular aperture 17 through which the tube end portion 15 projects, a curved wall 18 forming an enlarged annular chamber 19 and an angularly inclined circular flange 21 extending toward the tube end portion 15 in the general direction of the free end 14 of the latter. The flange 21 terminates in radially spaced relation to the surface of the tube end portion 15 to provide an access opening 22 in communication with the chamber 19.

The cage 13 is fixedly retained against axial movement along the tube 12 by a retention means which preferably comprises roll-formed upset beads 23-24. The upset beads abut the outer and inner surfaces, respectively, of the cage base portion 16.

The coupling 11 further comprises a second tube 25 having its end portion 26 telescopically slidable over the end portion 15 of the first tube 12 end portion 15. The free end 27 of the second tube end portion 26 is provided with an outwardly extending flare 28. The flared end in coupling assembled condition projects through the access opening 22 in the cage 13 into the chamber 19, for a reason to become apparent.

A circular spring 29 is contained with the chamber 19 of the cage 13, the spring also being known as a garter spring. In assembled condition of the coupling, as seen in FIG. 1, the spring 29 is interposed between the flare 28 on the tube end 27 and the inner wall of the flange 21 of the cage 13 and thereby prevents separation of the tubes 12 and 25 in a direction to cause telescopic disengagement of the two tubes. Before explaining this in greater detail, the physical description of the coupling will be completed.

The inner tube end portion 15 has spaced circular grooves 31 formed in its tubular wall, the grooves accommodating conventional "O" rings 32. The "O" rings 32 in assembled condition of the coupling are compressed in a sealed mode thus preventing leakage between the two tube end portions 15 and 26, respectively. The "O" rings being seated in the grooves are highly visible prior to assembly of the tubes.

Figure 2:
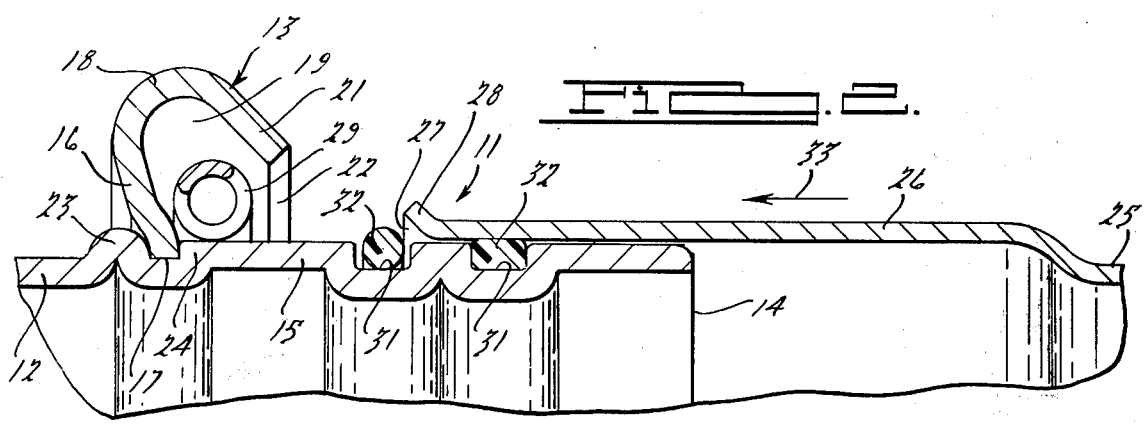
FIG. 2 is a view in part similar to FIG. 1 illustrating the parts of the coupling at the beginning of the assembly.
Figure 3:
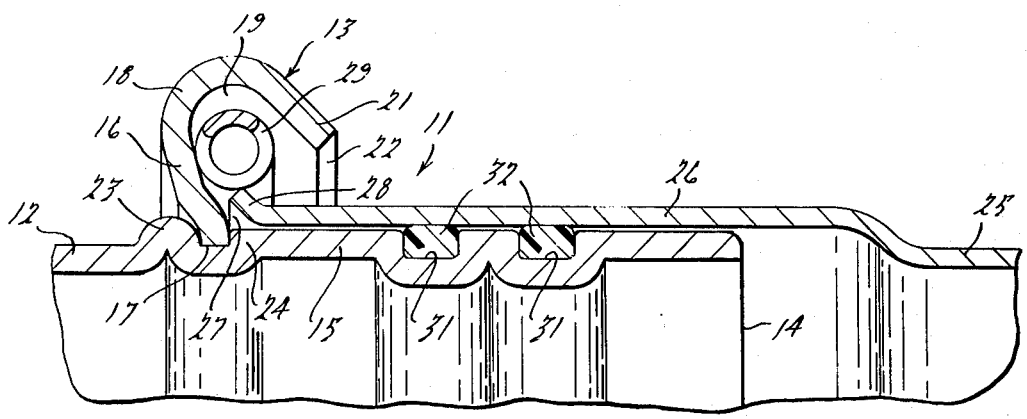
FIG. 3 is a view in part similar to FIGS. 1 and 2 illustrating the relationship of the coupling parts immediately prior to achieving the fully assembled condition of FIG. 1.

The assembly of tubular coupling 11 may best be understood with reference to FIGS. 2, 3 and 1 in that sequence. In FIG. 2, the end portion 26 of the tube 25 is shown partially telescoped over the end portion 15 of the tube 12. Further movement of the tube 25 in the direction of the arrow 33 causes the flare 28 on the end 27 of tube 25 to enter the access opening 22 in the cage 13. The tube end 27 will then abut the circular or garter spring to cause the latter to expand as shown in FIG. 3. By proper selection of the spring tension, the axial force required to force the flared end of the tube under the spring as the latter is caused to expand can be well within the physical capability of the assembler.

As the tube end 27 abuts the inner wall of the cage base 16, the spring 29 will snap over the flare 28 and assume the relationship shown in FIG. 1. That is, it will be interposed between flare 28 and cage flange 21 to hold the tubes in assembled relationship.

As will be seen clearly from the drawings the inclined surface of the flared end portion 28 of the tube 25 makes an angle with the longitudinal axis of the tube which is substantially the same as the angle made to the same axis by the inner surface of the flange 21 on the cage 13. The spring 29, in the connected condition of the coupling illustrated in FIG. 1, is thus confined between substantially parallel surfaces. In consequence, the reaction forces imposed on the spring at the points of contact with these two surfaces are diametrically opposite and there is no resultant force on the spring engendered by any force tending to separate the two members of the coupling. The security of the coupling is not therefore impaired by the pressure existing within the coupled tubes.

Disassembly of the coupling preferably is accomplished with a special tool, generally designated 34, see FIGS. 4 to 7, inclusive. The tool 34 is of particular value when the coupled tubes contain fluid under pressure, such as conduits containing Freon for an air conditioning system. It is preferable that the system be vented prior to disassembly rather than to release the coupling under restraint and have the tubes blown apart. The tool 34 permits restrained disassembly as a result of its construction and arrangement which is as follows:

The tool 34 comprises a cylindrical body 35 having an internal diameter sufficient to accommodate the external diameter of the cage 13. The body 35 has a base wall 36 at one end which has an aperture 37 adapted to accommodate the tube 12. The body 35 has an end plate 38 at its other end. The end plate 38 has an aperture 39 and an inwardly projecting annular portion or boss 41 extending toward the base wall 36.

The cylindrical body 35 preferably comprises symmetrical half sections 35a and 35b which are mounted on overlapping hand grip members 43 and 44 pivotally coupled at 45 at the end of the elongated grip members opposite that carrying the body half sections. Intermediate the pivot 45 and the end of the hand grip members carrying the semi-cylindrical sections, a detent 46 on one hand grip member coacting with the wall of aperture 47 in the other hand grip member is provided to lock the tool in operative conditon after the half sections have been moved in tube and cage encompassing position by a scissor-like movement.

As indicated in FIG. 4, the tool is positioned with the cylindrical body encompassing the cage 13 and with the tool annular portion 41 aligned with the access aperture 22 in the cage 13. The tool is then urged in the direction of the arrow 42 which causes the circular or garter spring 29 to be expanded and to roll up the flare 28 on the end 27 of the tube end portion 26. The tube 25 may then be pulled axially away from the cage 13. As the tubes 12 and 25 are moved relatively in a direction to separate them, the flare 28 abuts the end of the annular portion 41 of the end plate 38 and causes the tool 34 to be moved axially in the same direction as the tube 25.

The movement of the tool 34 is limited or restrained, however, by a built-in stop means comprising the base wall 36 which abuts the base 16 of the cage 13 as shown in FIG. 5. The interference between the flare 28 and the end of the annular portion or boss 41 on the end plate 38 in turn restrains further movement of the tube 25 in axial separation direction. As indicated by the arrows 47 in FIG. 5, the pressure in the system is permitted to vent between the overlying tube end portions 15 and 26 past the "O" ring 32, since the movement permitted between the parts as shown in FIGS. 4 and 5 is sufficient to uncover the "O" rings.

After the system has been vented, the tool half sections 35a and 35b may be pivotally separated from each other and the tool 34 removed from the tubular coupling. The tubes 12 and 25 then may be further moved axially away from each other for complete disassembly.

It is to be understood this invention is not limited to the exact construction illustrated and described above, but that various changes and modifications may be made without departing from the spirit and scope of the invention as defined by the following claims.

I claim:

1. A tubular coupling comprising:
a first tube having an end portion,
a cage means mounted externally on the end portion in axially inwardly spaced relation to the terminal end of the latter,
the cage means having a radial base portion having a circular aperture through which the tube end portion projects, a curved wall forming an annular chamber and a circular flange angularly inclined toward the tube end portion in the general direction of the terminal end of the latter, the flange terminating in radially spaced relation to the tube end portion surface,
retention means on the first tube end portion engaged with the base portion of the cage means to hold the latter against axial displacement,
a second tube having an end portion telescopically mounted on the first tube end portion and having an outwardly inclined flare at its terminal end, the flared end projecting into the cage means through the space between the surface of the first tube end portion and the cage means flange, the inclined outer surface of the flared end of the second tube making an angle with the longitudinal axis of the second tube which is substantially the same as the angle made to the same axis by the inner surface of the inclined flange, circular spring means contained within the cage means interposed between the second tube end portion flare and the cage means flange preventing axial withdrawal of the second tube end portion from the cage means and thereby preventing telescopic disengagement of the second tube from the first tube, and "O" ring means externally mounted on the first tube end portion between the terminal end of the latter and the retention means to prevent leakage between the telescoped tube end portions.

2. A tubular coupling according to claim 1, in which:

the circular spring means comprises an expandable garter spring, and the hollow chamber is of sufficient size to permit expansion of the garter spring by a tool means so that the garter spring may be slipped over the second tube flare for withdrawal of the terminal end of the second tube from the cage means.

3. A quick-connect tubular coupling according to claim 1, in which:

a spring means displacement tool has an annular portion projecting through the aperture in the cage means, the displacement tool being axially shiftable along the tubes in a direction to urge the spring means out of engagement with the flared leading edge of the second tube end portion, and stop means on the displacement tool engagable with the cage means limiting withdrawal movement of the second tube relative to the first tube to a position at which the "O" ring means is released from its sealed mode to provide a pressure relief vent.

4. A quick-connect tubular coupling according to claim 3, in which:

the displacement tool comprises a cylindrical body having split symmetrical half sections, and pivot means support the half sections for swinging movement into and out of straddling relationship to the tubes and cage means when the annular portion is displaced from within the cage means.

5. A quick-connect tubular coupling according to claim 3, in which:

the displacement tool has a cylindrical body having an internal diameter sufficient to accommodate the cage means, the body having an apertured base wall at one end and an apertured end plate at the other end, the base wall aperture accommodating the first tube and the end plate aperture the second tube, the apertured end plate carries the annular portion projecting inwardly toward the base plate, the annular portion being slidable on the second tube toward abutting engagement with the flare and the circular spring to cause expansion of the latter into the cage means, the base portion of the cylindrical body abutting the cage means to function as a part of the stop means limiting withdrawal movement of the second tube from the first tube, the remainder of the stop means comprising abutting surfaces of the second tube flare and the apertured end plate annular portion.

6. A quick-connect tubular coupling according to claim 5, in which:

the cylindrical body is split into symmetrical half sections, and pivoted means support the half sections for swinging movement into and out of tube and cage means encompassing relationship when the annular portion is outside of the cage means.

7. A quick-connect tubular coupling according to claim 6, in which:

the cage means has an enlarged hollow annulus into which the circular spring means is expanded upon the flared end of the second tube portion passing therebeneath or upon being engaged by the annular portion of the displacement tool upon the latter being moved inside the cage means toward the base wall of the latter.

* * * * *

UNITED STATES PATENT OFFICE
CERTIFICATE OF CORRECTION

Patent No. 4,055,359            Dated October 25, 1977

Inventor(s) IRVIN E. McWETHY

It is certified that error appears in the above-identified patent and that said Letters Patent are hereby corrected as shown below:

Column 1, line 18, should read:
    patent 3,933,378 issued January 20, 1976.

*Signed and Sealed this*

*Fifteenth* Day of *August 1978*

[SEAL]

Attest:

RUTH C. MASON
*Attesting Officer*

DONALD W. BANNER
*Commissioner of Patents and Trademarks*